July 14, 1942. F. M. YOUNG ET AL 2,289,402
COMBINATION OIL AND JACKET LIQUID COOLER FOR AIRCRAFT
Filed March 21, 1940 5 Sheets-Sheet 1

INVENTORS
FRED M. YOUNG
JOHN J. HILT
GEORGE J. HAISLMAIER
BY
ATTORNEY

July 14, 1942.  F. M. YOUNG ET AL  2,289,402
COMBINATION OIL AND JACKET LIQUID COOLER FOR AIRCRAFT
Filed March 21, 1940  5 Sheets-Sheet 3

INVENTORS
FRED M. YOUNG
JOHN J. HILT
GEORGE J. HAISLMAIER
BY A.S.Kroh
ATTORNEY

INVENTORS
FRED M. YOUNG
JOHN J. HILT
GEORGE J. HAILSMAIER
BY  A.S.Kroh
ATTORNEY

July 14, 1942.  F. M. YOUNG ET AL  2,289,402
COMBINATION OIL AND JACKET LIQUID COOLER FOR AIRCRAFT
Filed March 21, 1940   5 Sheets-Sheet 5

INVENTORS
FRED M. YOUNG
JOHN J. HILT
GEORGE J. HAISLMAIER
BY
ATTORNEY

Patented July 14, 1942

2,289,402

UNITED STATES PATENT OFFICE 2,289,402

COMBINATION OIL AND JACKET LIQUID COOLER FOR AIRCRAFT

Fred M. Young, John J. Hilt, and George J. Haislmaier, Racine, Wis., assignors to Young Radiator Company, Racine, Wis., a company of Wisconsin Application March 21, 1940, Serial No. 325,196

1 Claim. (Cl. 257—2)

The present invention relates to aeronautical heat exchangers wherein the cooling medium is air which is preferably forced through bundles of tubes by frontal pressure and wherein the lubricating oil and jacket cooling fluid are forced between the tubes of certain bundles of tubes in heat exchange contact with the air and with each other.

Airplanes must operate in extreme temperatures and are subjected to extreme and sudden temperature changes. They are frequently called on for quick starting and getaways under extremely low temperatures therefore in addition to normally cooling the oil and jacket fluid, the device must permit the oil and jacket fluid to be quickly heated to the most desirable operating temperature.

Our device is not only adapted to normally cool the lubricating oil and jacket fluid but will act also to insure a quick increase in oil temperature to the desired point when the airplane engine is first started and exposed to subzero weather and provides heat exchange between the oil and jacket fluid whereby one or the other may act as a cooling or heating medium.

One of the objects of the present invention is to provide maximum heat exchange capacity at minimum weight and size and to provide a device which is practically proof against damage by varying temperatures and internal pressures or other operating conditions.

To these and other useful ends, our invention consists of parts, combinations of parts, or their equivalents, and mode of operation, as hereinafter set forth and claimed and shown in the accompanying drawings in which:

Fig. 3 is a plan view of the deflector plates which may be used in the outside jacket cooling compartments.

Fig. 4 is a fractional end view of a jacket cooling portion of the device illustrating how the deflector plates may be positioned between certain rows of tubes.

Fig. 5 is a fragmentary front view of the oil cooling tubes and the prewarming chambers or heat exchange partitions illustrating the shape of the deflector plates and how they lie between the ends of the tubes.

Figure 1:
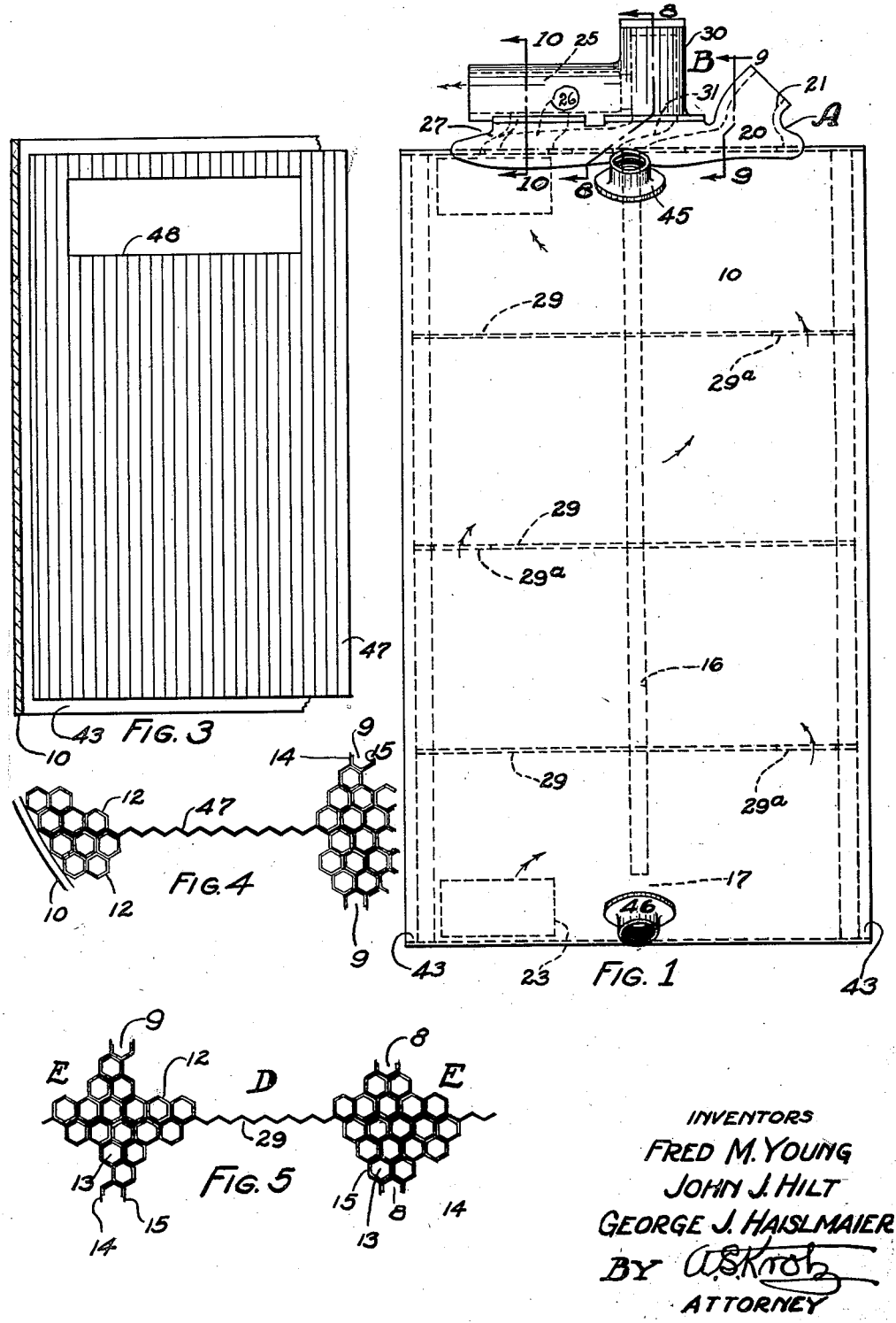
Fig. 1 is a side elevational view of our improved device adapted to cool the lubricating oil and the jacket fluid of the engine.

As thus illustrated, the housing shell is designated by reference numeral 10. The ported bracket on which the control valve is mounted is designated in its entirety by reference character A. The valve mechanism and its housing in their entireties are designated by reference character B. Member A is ported, as illustrated in Figures 6, 7, 8, 9, 10 and 11 and as shown by dotted lines in Figure 1 as will hereinafter appear.

The center bundle of tubes in the design shown in Figures 1 to 12 is designated in its entirety by reference character D (see Figure 2) and the jacket fluid cooling bundles of tubes are designated in their entireties by reference characters E—E.

The tubes 11 in all the figures are similar, the bodies being preferably round, the ends being expanded into hexagon shapes as at 12 as illustrated in Figures 4, 5, 11 and 12. The warm-up chambers or partitions 8 and 9 are each preferably formed by leaving out one or more vertical rows of tubes and by means of partition walls 14—14 and 15—15 (see Figures 2, 4, 5 and 12). Members 14 and 15 are preferably shaped as illustrated for their entire length. The ends of these chambers are filled by means of hexagon shaped caps 13 formed from sheet metal (see Figure 11).

Figure 11:
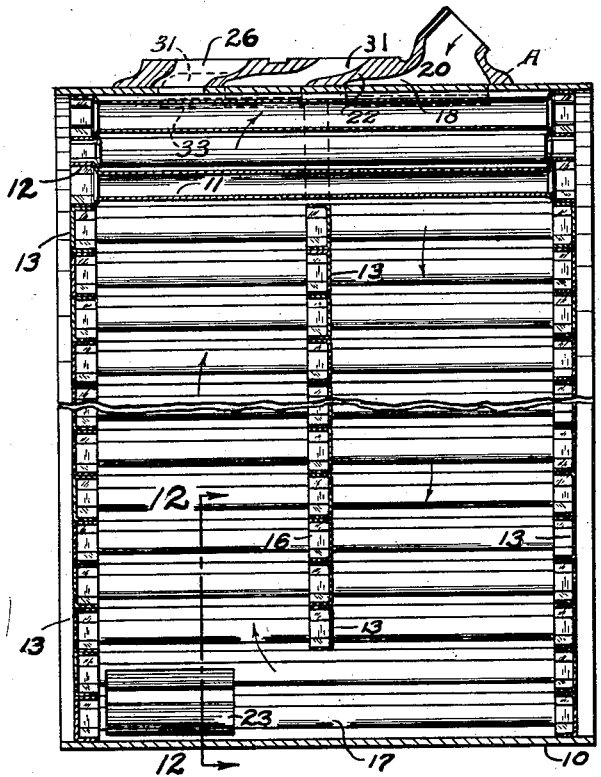
Fig. 11 is a transverse sectional view taken on line 11—11 of Figure 2.

Caps 13 may be used for forming baffle partition 16 (see Figures 1 and 11). If, however, the body of members 14 and 15 is left flat, then a single sheet of flanged material may be used with which to form the baffle.

A number of caps 13 are left out at the bottom of each warm-up chamber forming a passageway 17 so the oil may pass around the bottom of the partition from one side to the other.

It will be seen that suitable warm-up chambers are provided having considerable more surface than if straight plates were used for forming these members and the rows of tube ends adjacent the warm-up chambers may be nested together and against the partitions. Thus in addition to increasing the heat exchange capacity of our improved pre-warming chambers, a considerable saving in weight and size is accomplished and a more efficient heat exchange means is provided between the oil and coolant in chambers D and E.

It will be noted that partitions 14 and 15 have suitable shapes whereby they may extend for the full length of the tubes including the expanded hexagon shaped portion and lying between the hexagon shaped portions and that spaces will be left between these partitions that may be filled by caps 13 for closing the ends of warm-up chambers 8 and 9 (see Fig. 11).

Base A is provided with an inlet port 20 being screw threaded as at 21 (see Fig. 6) and is provided adjacent this port with a widened pocket 18 (see Figures 7 and 9) which uncovers the warm-up chamber ports 19—19 in housing 10, these ports registering with chambers 8 and 9. Chamber 18 is caused to terminate before reaching partition 16 by a partition 22. Thus it will be seen that oil entering port 20 may pass down through chambers 8 and 9 on the adjacent side of partition 16 and then flow to the other side of member 16 as at 17 from whence it will either flow to the relief valve as indicated by single pointed arrows in Fig. 11 or into the center bundle of tubes as will hereinafter appear.

Partitions 15 are each provided with cut-away ports 23 whereby the oil may enter chamber D through these ports. Chamber D is filled by a bundle of tubes 11 their ends being expanded and hexed and lying together as illustrated in Figures 2, 4, 5, 11 and 12 so as to form a closed chamber at both ends. Therefore the oil that enters chamber D through openings 23 must pass upwardly between the tubes through opening 24 in the housing shell and to the outlet 25 through ports 26 and 27 (see Figures 7 and 10). Outlet 25 is screw threaded as at 28.

It is desired that the length of travel of the oil through chamber D be increased. For this purpose, we provide baffle plates 29. These baffle plates have cut-away portions 29ª at one end similar to that shown in Figure 3 which are positioned alternately (see Figure 1) the plates lying between the hexagon ends of the tubes so the oil will be forced to pass back and forth between the tubes of chamber D sinuously. In a similar manner, a suitable number of baffles 47 may be positioned in chambers E with openings 48 positioned alternately so the coolant may, if desired, be caused to pass through chambers E sinuously (not shown).

When exposed to subzero weather, the oil congeals so hard that it is almost impossible to move it between the large number of tubes as next above described. We provide means whereby during such times, the oil may be shunted around these tubes as follows:

Valve B is provided with a housing 30. A chamber 31 is provided in member A which forms an outlet for ports 33 in housing 10, these ports communicating with chambers 8 and 9 on the discharge side of baffle partition 16. Chamber 31 extends forwardly for a short distance on opposite sides of port 26 (see dotted lines in Figure 6) and registers with ports 33.

Housing 30 is provided with a valve seat opening 34 which leads from chamber 31 through opening 35. A valve 36 is provided with a stem 37 which loosely extends into an opening 38 in cap 39 and is held on the valve seat by means of a spring 40.

Figure 7:
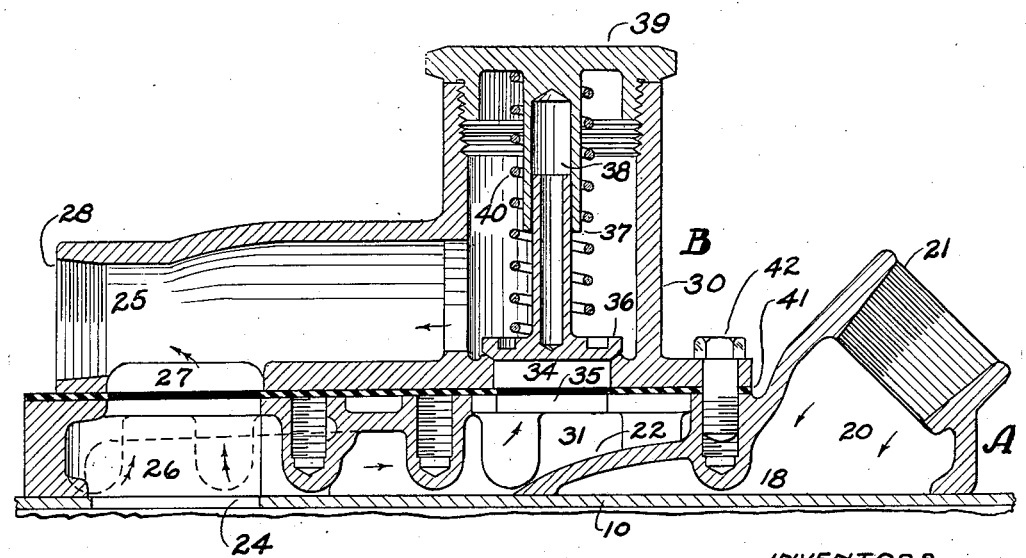
Fig. 7 is a central vertical section through the base shown in Figure 6 and through the valve mechanism.
Figure 8:
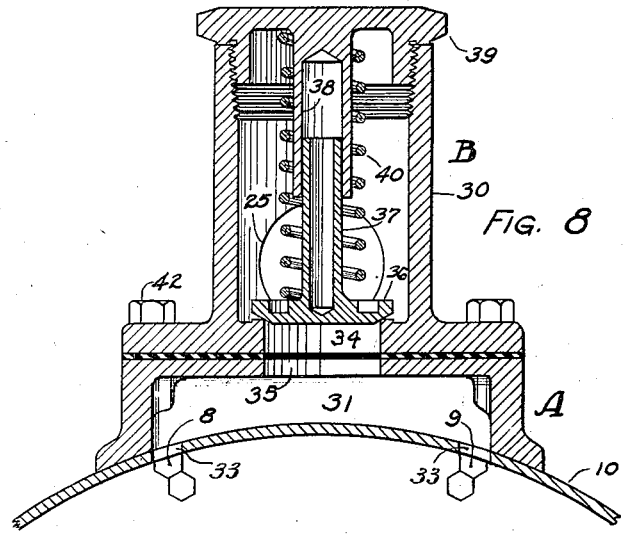
Fig. 8 is a transverse sectional view through the base and valve chamber taken on lines 8—8 of Figure 1.
Figure 9:
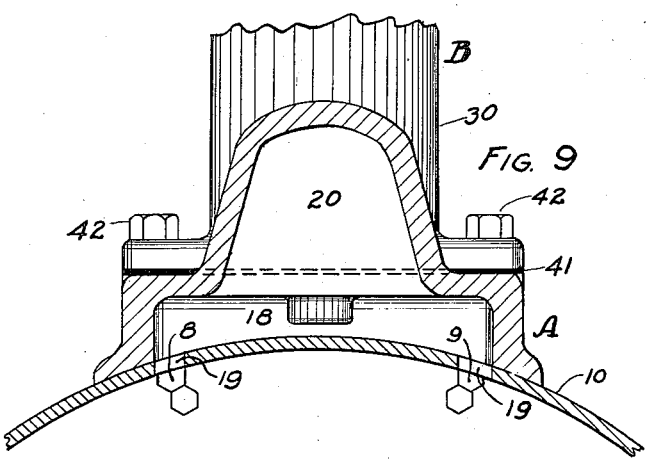
Fig. 9 is a transverse section taken on line 9—9 of Figure 1.
Figure 10:
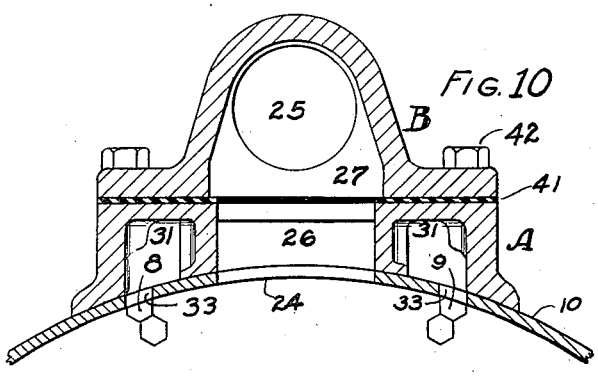
Fig. 10 is a transverse section taken on line 10—10 of Figure 1.
Figure 12:
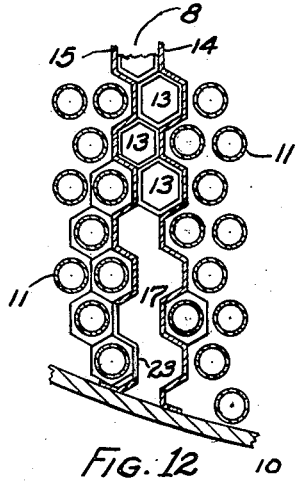
Fig. 12 is a transverse fractional sectional view of one of the precooling chambers or partitions taken on line 12—12 of Figure 11.

Outlet chamber 25 extends into the valve chamber as clearly illustrated in Figure 7. Thus it will be seen that when oil cannot flow between the tubes in chamber D, it will flow around partition 16 to the valve, lifting the valve against the pressure of spring 40 and escaping through outlet 25. Thus the device is protected against abnormal oil pressure. After the heated oil passing through the prewarming chambers 8 and 9 has had time to heat the oil in chamber D sufficiently so it will flow freely the valve will automatically close after which the oil will all flow between the tubes in chamber D as already described.

It will be noted that member B is separated from member A by a gasket 41 and is held to member A by means of a suitable number of bolts 42. Thus it will be seen that members A and B may be easily manufactured, that member A may be shaped so it may easily be secured to housing 10 by bonding and that member B may be easily gasketed and sealed to member A thus providing suitable port connections between these members and between member A and the housing ports.

We have shown how the lubricating oil will be cooled by air which is forced through the tubes by frontal pressure and how the flow of oil is controlled by valve B, the oil being cooled as it passes between the tubes in chamber D and being permitted to pass through chambers 8 and 9 without being materially cooled by the air. It will be noted by observing Figures 1 and 3 that housing 10 is somewhat longer than the overall length of the tubes thus providing an extension 43 which is particularly useful on the front of the device in directing the air into the tube ends.

The tubes in chambers E are assembled in exactly the same manner as the tubes in chamber D are assembled. Suitable flanged pipe connections 45 are made in the top of chambers E and flanged pipe connections 46 are made in the bottom of these chambers. The jacket coolant is permitted to be discharged into either the top or the bottom flange connections and returns through the other flanged connections to the jackets.

In Figures 1 to 12, we have illustrated the flow of oil when the valve is open by single pointed arrows and have illustrated the flow of oil by means of double pointed arrows when the valve is closed. We have also illustrated the flow of jacket coolant through chambers E by single pointed arrows.

Thus, as the coolant flows into the system through fitting 45, it will pass transversely between the tubes in chambers E.

Thus a single unitary heat transfer device will act to normally cool the lubricating oil and the jacket cooling fluid by being brought in heat exchange contact with air which is forced through the tubes by frontal pressure.

Figure 2:
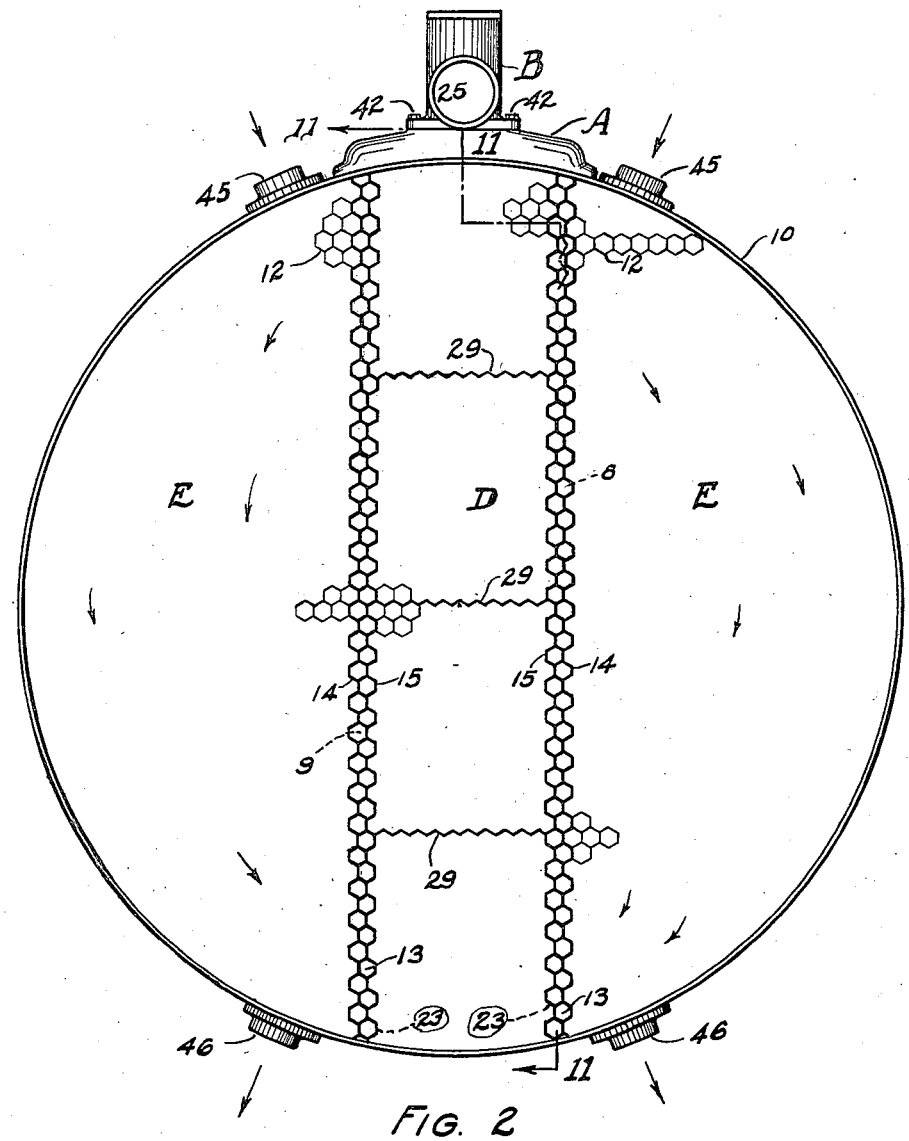
Fig. 2 is a front view of the device shown in Figure 1.
Figure 6:
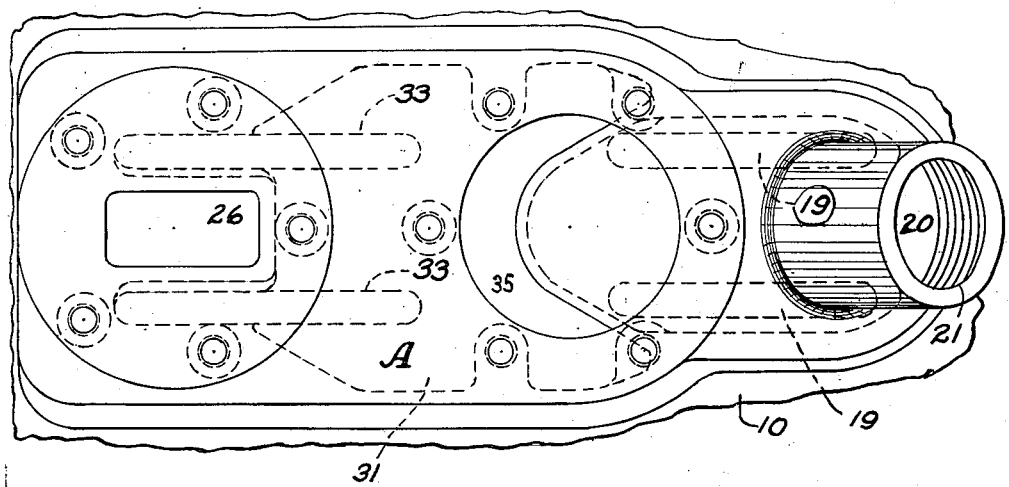
Fig. 6 is a top plan view of the base portion adapted to support the valve mechanism.

By scrutinizing Figure 2, it will be seen that because of members 14 and 15 and the oil between these members, heat exchange may take place between chambers D and E. That is if the oil passing through chamber D has a higher temperature than the coolant in chambers E, the coolant will be heated by the oil and if the temperature of the coolant is higher than the temperature of the oil, the oil will be heated by the coolant. In other words, the tendency is to equalize the temperatures of the oil and coolant. This interchange of heat between the three chambers will assist in quickly bringing the engine up to the most uniform economical operating temperature. Thus the engine served will be more quickly prepared for efficient operation than when separated units are provided for cooling the oil and coolant.

Clearly many minor detail changes may be made without departing from the spirit and scope of our invention as recited in the appended claim.

Having thus shown and described our invention, we claim:

A dual heat exchanger of the class described, comprising a housing shell, two spaced partitions longitudinally arranged in said shell to thereby form side chambers, and a center chamber, said partitions each comprising side walls having end closures forming narrow transverse oil passageways, closely spaced bundles of tubes extending through said chambers and having means to form headers for said chambers through which the tubes extend, separate inlet and outlet connections for said side chambers adapted to be operatively connected to one or more internal combustion engine cooling jackets, adjacent oil inlet and outlet connections in said oil passageways, outlet connections from said oil passageways into said center chamber on the opposite side of the device from said first inlet and outlet oil connections, means whereby the oil will normally pass through said oil passageways and then between the tubes of said center chamber and means whereby when the oil is too viscous to pass between the tubes in said center chamber, it will be by-passed through said oil passageways.

FRED M. YOUNG.
JOHN J. HILT.
GEORGE J. HAISLMAIER.